US010003651B2

(12) United States Patent
Lee

(10) Patent No.: US 10,003,651 B2
(45) Date of Patent: Jun. 19, 2018

(54) MARITIME COMMUNICATION SYSTEM AND METHOD

(71) Applicant: Marine Soft Co. Ltd., Busan (KR)

(72) Inventor: Jae In Lee, Busan (KR)

(73) Assignee: MARINE SOFT CO. LTD., Busan (KR)

( * ) Notice: Subject to any disclaimer, the term of this patent is extended or adjusted under 35 U.S.C. 154(b) by 0 days. days.

(21) Appl. No.: 14/440,355

(22) PCT Filed: Apr. 10, 2013

(86) PCT No.: PCT/KR2013/002994
§ 371 (c)(1),
(2) Date: May 3, 2015

(87) PCT Pub. No.: WO2014/069729
PCT Pub. Date: May 8, 2014

(65) Prior Publication Data
US 2015/0296021 A1    Oct. 15, 2015

(30) Foreign Application Priority Data
Nov. 2, 2012 (KR) .................. 10-2012-0123724

(51) Int. Cl.
*H04W 84/06* (2009.01)
*H04L 29/08* (2006.01)
*G06Q 10/10* (2012.01)
*H04B 7/185* (2006.01)
*H04M 1/725* (2006.01)

(52) U.S. Cl.
CPC ............ *H04L 67/12* (2013.01); *G06Q 10/10* (2013.01); *H04B 7/185* (2013.01); *H04M 1/72572* (2013.01); *H04M 1/72522* (2013.01)

(58) Field of Classification Search
CPC ...... G06Q 10/10; H04B 7/185; H04B 7/1851; H04B 7/204; H04M 1/72522;
(Continued)

(56) References Cited

U.S. PATENT DOCUMENTS 4,491,966 A * 1/1985 Morcerf ............... H04W 88/00
455/77
6,834,188 B1 * 12/2004 Menon ............... H04B 7/18567
455/427
(Continued)

FOREIGN PATENT DOCUMENTS

KR   10-1998-0024349   7/1998
KR   10-2004-0075803   8/2004
(Continued)

OTHER PUBLICATIONS

International Search Report Dated Jun. 14, 2013 From the Korean Intellectual Property Office Re. Application No. PCT/KR2013/002994 and Its Translation Into English.

*Primary Examiner* — Meless Zewdu
(74) *Attorney, Agent, or Firm* — Maschoff Brennan

(57) ABSTRACT

The present invention relates to a maritime communication system and method and provides a maritime communication system and method, the maritime communication system comprising: a plurality of user terminals by which a SNS can be used on the sea, and in which an application for providing content is installed; at least one maritime communication server for providing the SNS and the content for the user terminal on the sea; a land communication server for communicating with the maritime communication server and controlling communication between a user of the maritime communication server and a user located on land or a user of another maritime communication server; a content server for providing the content of the application via the land communication server; and a management server for producing and distributing the application installed in the user terminals or controlling operations of all the servers.

12 Claims, 13 Drawing Sheets

(58) Field of Classification Search
CPC ... H04M 1/72572; H04M 1/725; H04L 67/12; H04L 29/08; H04L 67/00; H04W 84/06; H04W 84/04; H04W 4/18; H04W 40/22; H04W 84/16; H04W 4/50; H04W 4/60; H04W 92/06; H04W 92/14; H04W 92/00; H04W 92/02; H04W 76/00; H01C 29/08
See application file for complete search history.

(56) References Cited

U.S. PATENT DOCUMENTS

| | | | |
|---|---|---|---|
| 7,974,293 B2 * | 7/2011 | Lee | G06Q 30/00 370/395.52 |
| 2002/0013767 A1 * | 1/2002 | Katz | G06Q 20/06 705/39 |
| 2005/0197190 A1 * | 9/2005 | Amaitis | G07F 17/32 463/42 |
| 2007/0241892 A1 * | 10/2007 | Kopp | G06Q 10/08 340/539.22 |
| 2008/0147257 A1 * | 6/2008 | Kuhlgatz | B63B 49/00 701/21 |
| 2009/0191810 A1 * | 7/2009 | Sogabe | H04B 7/18515 455/12.1 |
| 2009/0318139 A1 * | 12/2009 | Su | H04B 7/18506 455/431 |

FOREIGN PATENT DOCUMENTS

| | | | | |
|---|---|---|---|---|
| WO | WO 01/84412 A1 * | 11/2001 | | G06F 17/60 |
| WO | WO 2014/069729 | 5/2014 | | |

* cited by examiner

MARITIME COMMUNICATION SYSTEM AND METHOD

RELATED APPLICATIONS

This application is a National Phase of PCT Patent Application No. PCT/KR2013/002994 having International filing date of Apr. 10, 2013, which claims the benefit of priority of Korean Patent Application No. 10-2012-0123724 filed on Nov. 2, 2012. The contents of the above applications are all incorporated by reference as if fully set forth herein in their entirety.

TECHNICAL FIELD

The present invention relates to a maritime communication system and a method, and in particular to a maritime communication system and a method which allow to provide and use various contents through a mobile terminal on the sea, namely, on a ship like on the land.

BACKGROUND ART

Maritime workers are obliged to work in a working environment where daily work repeatedly continues in a limited space, thus strongly longing for social and cultural activities. However, a communication with the land is limited, so social community activities and using cultural content are almost impossible in the current communication service system.

Therefore, there is a strong demand for a new system which allows to transmit and receive messages or photos from a family, friends or colleges on another ship by using a smart phone, while providing cultural contents.

In addition, there is not any way for an owner of ship to confirm whether or not their instructions are delivered to each crew.

In case of working on the sea, a smart phone which in general is used on the land becomes useless.

SUMMARY OF THE INVENTION

Accordingly, the present invention is made to improve the above-mentioned problems. It is an object of the present invention to provide a maritime communication system and a method wherein contents can be served through a smart phone on the sea where a mobile communication network is not connected, which improves the problems wherein the smart phone that a maritime and fishing worker have used on the land becomes useless after boarding the ship, so it becomes possible to receive necessary contents on the ship and to communicate with his family and friends on the land through message and email service, and the smart phone can be used as a communication means between crews on the ship.

To achieve the above object, there is provided a maritime communication system, which may include a plurality of user terminals which can use Social Network Service (SNS) on the sea, an application being installed on each of the user terminals to provide contents; at least one maritime communication server which provides the SNS and contents of the user terminals on the sea; a land communication server which communicates with the maritime communication server through a satellite, thus controlling the communications between a user locating on the land and a user of another maritime communication server; a content server which provides a control of the application through the land communication server; and a management server which produces and distribute the application installed on the user terminal or controls the operations of the whole servers.

In addition, to achieve the above object, there is provided a maritime communication system which is connected to a network and servers on the land and performs a data communication through a satellite communication network, which may include at least one satellite communication equipment for connection to the satellite communication network; at least one user terminal which can be connected to the satellite communication network through the satellite communication equipment; and at least one satellite connection server which manages and controls satellite connections of the user terminal.

It is characterized in that the user terminal may include a content execution module for executing stored or provided contents; a terminal satellite communication module for performing a satellite communication; an inside communication module for performing other wired or wireless communications except for the satellite communication; an information input module for receiving information from the user; and an information display module for displaying the information to the user.

It is characterized in that for the user terminal, a smart device which can provide a SNS service is used, the smart device being available for message transmission, photo transmission, email transmission and wired/wireless talk function and receptions of contents.

It is characterized in that the maritime communication server may include a maritime satellite communication unit for communicating with the land communication server through the satellite communication; an inside communication unit for controlling the communications between the user terminals on the ship where the server is installed; a satellite communication control unit for controlling satellite communications; a storing unit for storing the information which contains contents; and a billing unit for billing the user for the use of the server.

It is characterized in that the maritime communication server further comprises a neighbor server communication unit for communication with near ships.

It is characterized in that the maritime satellite communication unit may include an information coding unit for coding the information, which is provided to the satellite, in compliance with the protocol of the satellite communication; a decoding unit for decoding the information provided from the satellite; a communication result judgment unit for judging a result of the satellite communication; and a satellite information confirmation unit for storing and confirming the satellite information.

It is characterized in that the inside communication unit may include a text communication module which allows a SNS type communication between the users of the smart devices on the ship; a voice communication module which allows a voice dialog; and a simultaneous broadcasting module which can provide text or voice information to all the users of the smart devices.

It is characterized in that the land communication server may include a land satellite communication unit which can perform communication with the maritime communication server through the satellite communication; and an outside server communication unit which can perform communication with an outside server locating on the land.

It is characterized in that the management server may include a communication control unit for controlling communications between the maritime communication server and the land communication server or the land communication server and the outside server; a content control unit for controlling operations of the content sever; an environment setting unit for remotely adjusting basic settings of each server; a user management unit for managing the information of the user who works on the ship; and a billing management unit for billing each user and at each step.

It is characterized in that the satellite connection server may include an inside communication unit for controlling communications between user terminals on the ship where the server is installed; a satellite connection management unit for controlling the satellite connection states of the user terminal; an information transmission unit for providing the information provided through the satellite communication equipment to the user terminal or providing the information of the user terminal to the satellite communication network; a storing unit for storing the information which contains contents; a billing unit for billing the user for the use of the server; and a neighbor server communication unit for communication with the near ship.

In addition, to achieve the above object, there is provided a maritime communication method, which may include a step wherein information is produced and stored on a user terminal; a step wherein a transmission of the information through a land or maritime communication server is requested; a step wherein the land or maritime communication server provides information to the opponent server through a satellite communication; and a step wherein the information is provided to another corresponding user terminal.

It is characterized in that the produced information contains the information of the user terminal of the opponent side which is intended to receive the information, and the maritime communication server confirms if the receiving terminal is the terminal that the maritime communication server manages, and the land server confirms if the receiving terminal is the terminal that a predetermined maritime communication server manages.

It is characterized in that the loading of the cyber money is requested on the user terminal, and the management server locating on the land loads and manages such a procedure, and a corresponding cyber money-related information is stored in the maritime communication server and the cyber money is deducted based on a service request by a maritime user.

In addition, to achieve the above object, there is provided a maritime communication method which allows an information exchange between users through a maritime communication server on the ship, which may include a step wherein information which will be provided to other users through one user terminal and produced and stored, a step wherein the information is provided to the maritime communication server, a step wherein the information of the other user contained in the provided information is searched, and a step wherein the information is provided to the searched other user terminal.

It is characterized in that the user terminal can simultaneously broadcast the same information to all other users.

Advantageous Effects

The present invention makes it possible to serve contents using a smart phone on the sea where a mobile communication network is not connected. In addition, the present invention can improve the problems wherein the smart phone that a maritime and fishing worker have used on the land becomes useless after boarding the ship, so it becomes possible to receive necessary contents on the ship and to communicate with his family and friends on the land through message and email service, and the smart phone can be used as a communication means between crews on the ship.

DESCRIPTION OF SPECIFIC EMBODIMENTS OF THE INVENTION

Figure 1:
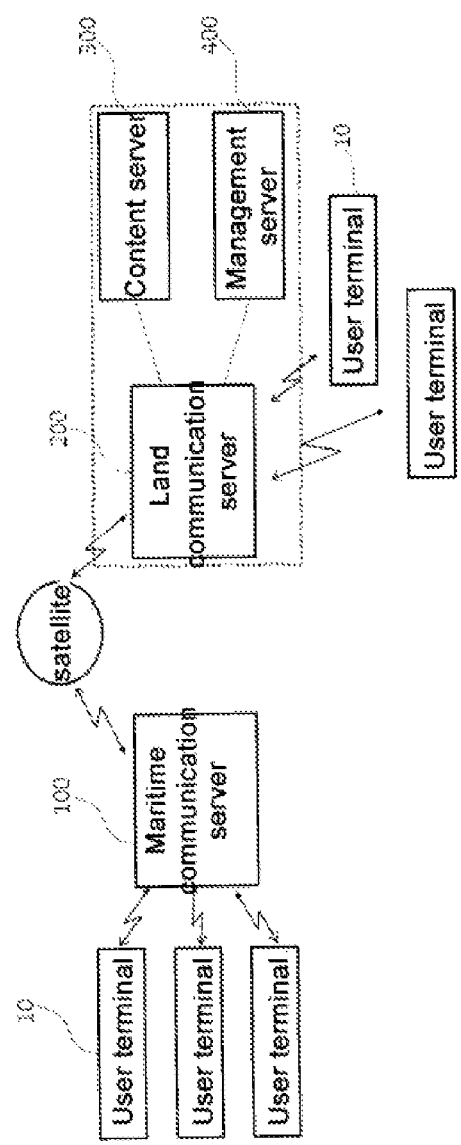
FIG. 1 is a block diagram illustrating a maritime communication system according to an exemplary embodiment of the present invention.

The exemplary embodiments of the present invention will be described with reference to the accompanying drawings. It is obvious that the present invention is not limited by the exemplary embodiments disclosed below, but will be implemented in various forms, provided that the exemplary embodiments of the present invention may allow to make complete the disclosure of the present invention and are provided to inform a person having ordinary skill in the art of the scope of the present invention, and it is noted that the same reference numbers in the drawings represent the same components.

It is noted that the components of the present invention are categorized based on each main function that each component has. Namely, two or more than two component units, which will be described below, may be combined into one component unit or one unit may be classified into two or more than two component units for each function. Each of the component units, which will be described below, should be understood to additionally perform part or all of the functions that another component has, in addition to the main function that the component itself has, and in addition, part of the functions that each component unit has may be exclusively performed by another component unit. Therefore, the presences of each component unit, which will be described in the present specification, should be interpreted based on their functions. For this reason, it is obvious that the configuration of the component units of a maritime communication apparatus and method may differ from each other within the limitations to the extent that the objects of the present invention can be achieved.

FIG. 1 is a block diagram illustrating a maritime communication system according to an exemplary embodiment of the present invention.

Figure 2:
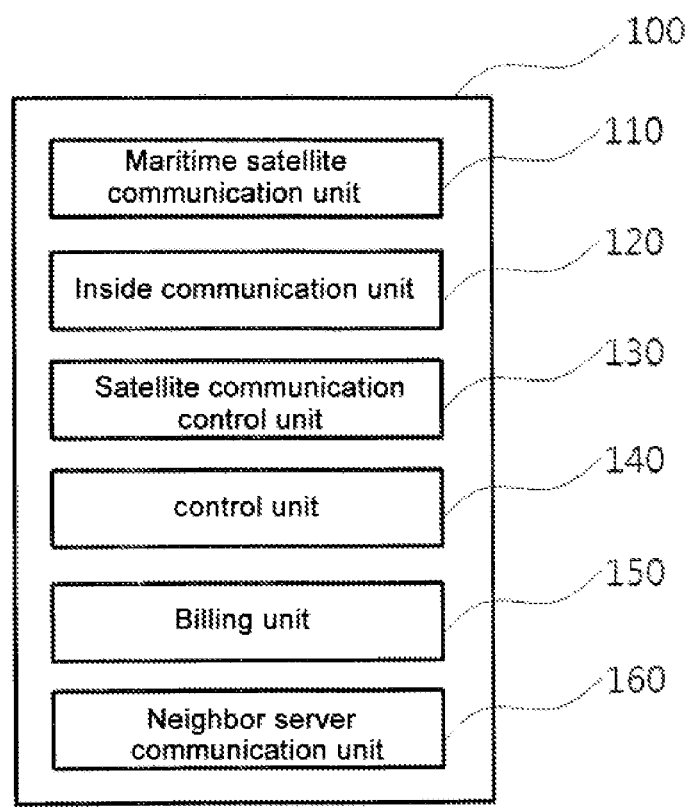
FIG. 2 is a block diagram illustrating a maritime communication system according to an exemplary embodiment of the present invention.
Figure 3:
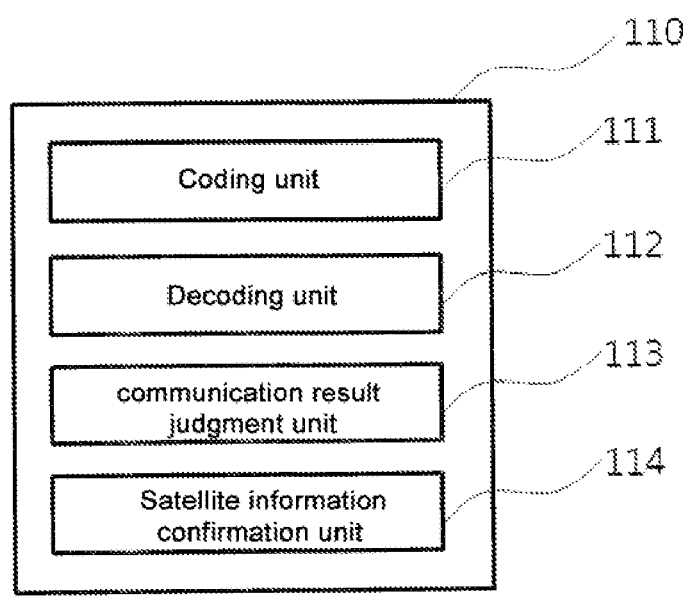
FIG. 3 is a block diagram illustrating a maritime communication system according to an exemplary embodiment of the present invention.
Figure 4:
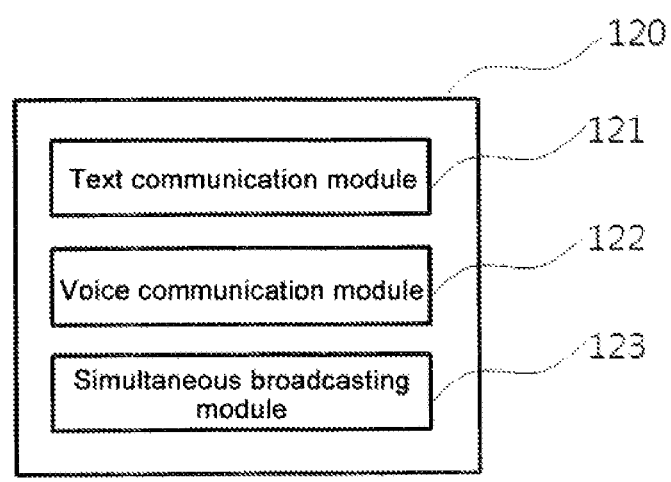
FIG. 4 is a block diagram illustrating an inside communication unit according to an exemplary embodiment of the present invention.
Figure 5:
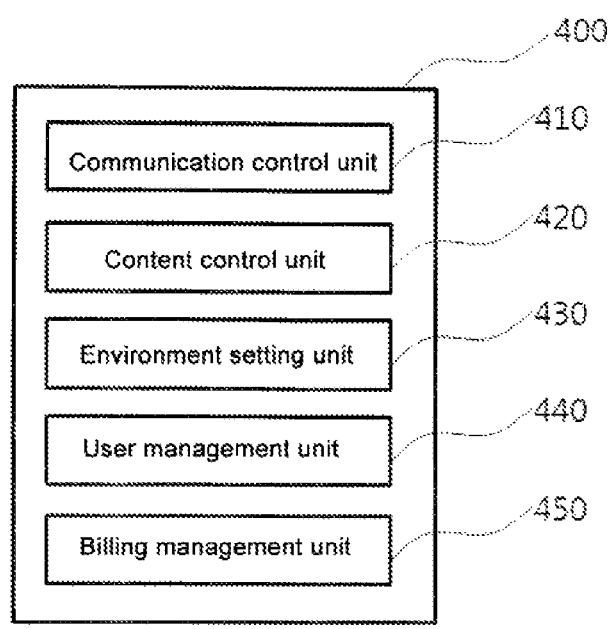
FIG. 5 is a block diagram illustrating a management server according to an exemplary embodiment of the present invention.
Figure 6:
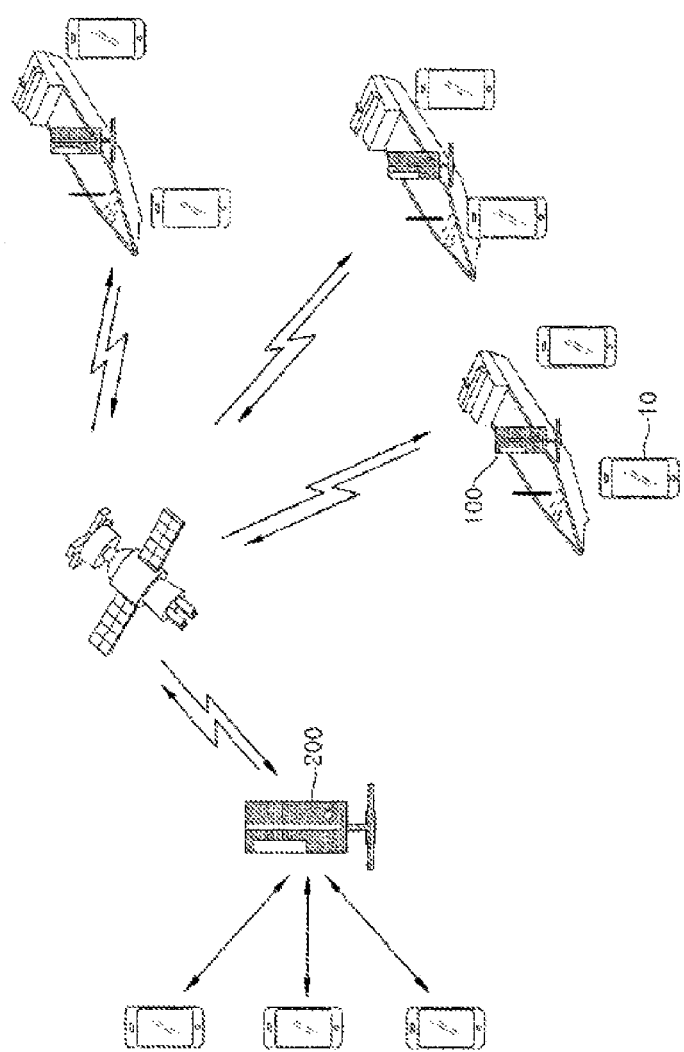
FIG. 6 is a view for describing a maritime communication system according to an exemplary embodiment of the present invention.
Figure 7:
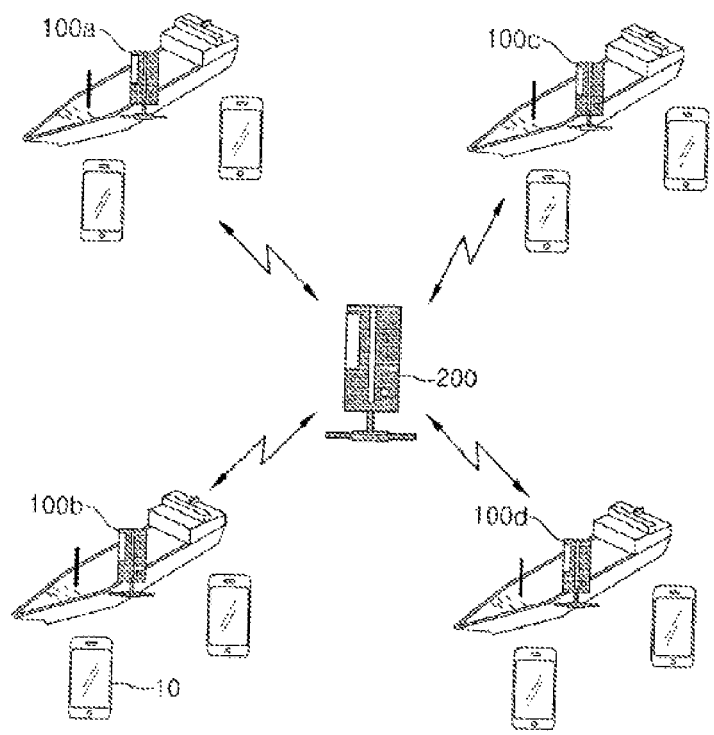
FIG. 7 is a view for describing a communication between maritime communication servers through a land communication server.
Figure 8:
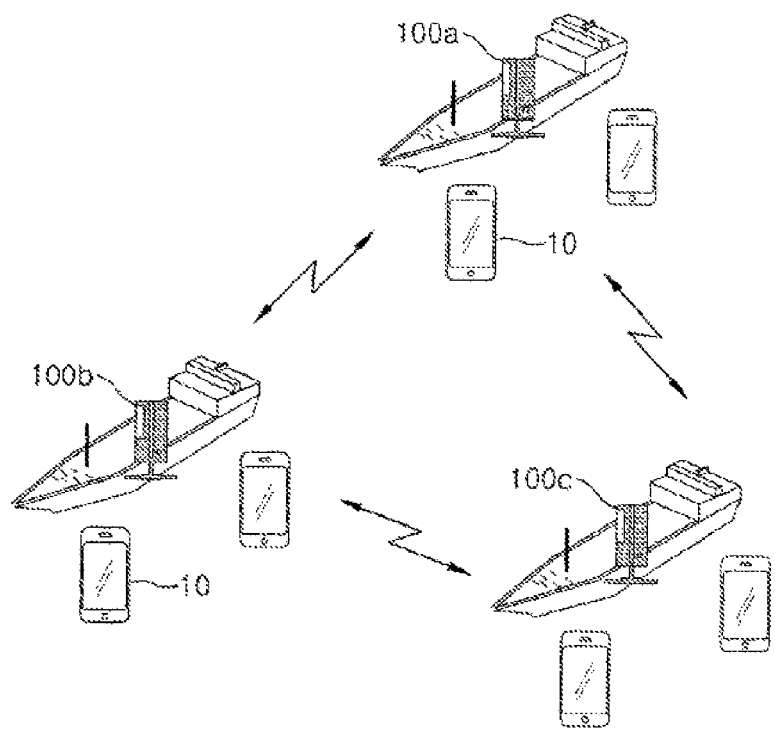
FIG. 8 is a view for describing a communication which uses a maritime communication server between near ships.

FIG. 2 is a block diagram illustrating a maritime communication system according to an exemplary embodiment of the present invention. FIG. 3 is a block diagram illustrating a maritime communication system according to an exemplary embodiment of the present invention. FIG. 4 is a block diagram illustrating an inside communication unit according to an exemplary embodiment of the present invention. FIG. 5 is a block diagram illustrating a management server according to an exemplary embodiment of the present invention. FIG. 6 is a view for describing a maritime communication system according to an exemplary embodiment of the present invention. FIG. 7 is a view for describing a communication between maritime communication servers through a land communication server. FIG. 8 is a view for describing a communication which uses a maritime communication server between near ships.

Referring to FIGS. 1 to 8, the maritime communication system according to the exemplary embodiment of the present invention may include a plurality of user terminals 10 which can use SNS on the sea and each has an application which provides a variety of contents, at least one maritime communication server 100 which can provide the SNS and contents of the user terminal 10 on the sea, and a land communication server 200 which is configured to control a communication between the user locating on the land and the user of another maritime communication server 100 by communicating through a satellite with the maritime communication server 100. In addition, there may be further provided a content server 300 which provides the contents of the application through the land communication server 200, and a management server 400 which produces and distribute the application installed on the user terminal and controls the operations of the whole servers.

First, it is more effectively preferred to use a smart device (for example, including a smart phone, a smart pad, a tablet PC, etc.) as the user terminal 10.

It is preferred that the user terminal 10 has an application, namely, app, which can provide a SNS service. It is effective that the App is a SNS app. Such an app can allow to transmit a message, a photo, an email, etc. between friends and has a function of a wired/wireless talk function. With the aid of this function, a free voice dialog can be possible on the ship. In case of the communication with the land side, it can be available at the set time due to the limitations to the connection time or for the authorized time. Of course, in case where transmission in real time is not available, a corresponding message or photos, etc. may be temporarily stored.

The menu of the app may include a walkie-talkie for voice communication, a friend registration, a dialog window, a connection to a friend registered in a telephone book and a content service. Of course, such a menu configuration is not limited thereto and may be formed in various forms of menu configurations. In addition, it is effective that the app is developed using Java language or objective-C language. In addition, the app is developed in compliance with the protocol, and HTML 5, Jquery, Sencha, etc. may be selectively used.

The app may serve to provide various contents. Such various contents, for example, educational material in company, state-of-art equipment manual, major work instruction, test materials for promotions of shipping professionals, current affair refinement, language learning material for English, music, game, news, etc. may be received from the land content server in order to enjoy on the smart device which is the user's terminal.

The app of the present invention may include a friend classification list function wherein the working crews of the ship, families, friends, etc. may be listed up in cooperation with the registered names and numbers of the telephone book of the smart device, and the messages related thereto may be stored. In addition, different from the conventional SNS app, there may be provided a dialog function wherein long sentences can be made, and photos and images can be attached. In addition, there may be further provided a function wherein the photo-based current news and interested matters may be posted using my profile function so that the colleagues of another ship or his family or friends can view.

The ship, namely, the user locating on the sea can connect to the maritime communication server for the sake of services of his terminal.

The maritime communication server 100 may include a maritime satellite communication unit 110 for performing a communication with the land communication server 200 through the satellite communication, an inside communication unit 120 for controlling the communication between the user terminals 10 on the ship where the server is installed, a storing unit 140 for storing the information including the contents, and a billing unit 150 for billing the user for the use of the server. Of course, the maritime communication server 100 may further include a neighbor server communication unit 160 for the same of communication with near ships.

The maritime satellite communication unit 110 performs a communication with the land communication server 200 or another maritime communication server 100 for the sake of communication with the satellite in accordance with a control signal of the satellite communication control unit 130.

Here, the maritime satellite communication unit 110 may include an information coding unit 111 for coding the information, which is intended to be provided to the satellite, in compliance with the protocol of the satellite communication, a decoding unit 112 for decoding the information from the satellite, and a communication result judgment unit 113 for storing and confirming the satellite information. The maritime satellite communication unit 110 may include an antenna for the sake of communication with the satellite.

With the above-mentioned configuration, the maritime satellite communication unit 110 can communicate with the International Marine Satellite Organization (INMARSAT) satellite as well as the VAST satellite and can code or decode the signals matching therewith. In the exemplary embodiment of the present invention, there may be provided a communication result judgment unit 113 for judging the success of the satellite communication, thus recognizing that the satellite communication has succeeded. In addition, if the communication with one satellite has failed by confirming the information of a communication-available satellite through a satellite information confirmation unit 114, it can be possible to perform a continuous satellite communication through the communication with another satellite.

Of course, the above configuration is not limited thereto. The maritime satellite communication unit 110 may perform a satellite communication at only the set time.

The inside communication unit 120 makes it possible to perform a communication including the SNS between the users of the smart devices on the ship.

The inside communication unit 120 may include a text communication module 121 for providing a SNS type communication (namely, dialog) between the users of the smart devices on the ship, a voice communication module 122 for the sake of voice dialog, and a simultaneous broadcasting module 123 for providing the same texts or voice information to the users of all the smart devices.

The inside communication unit 120 can provide a free communication between the crews on the ship through the above-described modules, through which communication between the crews can be good. In case of the emergency instructions, it is advantageous that the simultaneous broadcasting can be available, thus effectively delivering any instructions.

It is effective that the inside communication unit 120 stores and manages the information of the communication-possible smart device. For this, it is preferred that an additional registration procedure may be processed or the smart device connected to the maritime communication server 100 can be automatically recognized. Namely, in the above manner, the inside communication unit 120 can provide the information of the user terminal 10, which can do an inside communication, namely, the information of the smart device to the user terminal 10.

The satellite communication control unit 130 serves to control the operations of the satellite communication unit 110, so the communication with the satellite can be controlled in accordance with the demand from the manager or the demand of the inside satellite communication.

Of course, the communication with the satellite in real time may be possible based on the setting by the manager. However, if the manager sets time or sets the amount of communication data, the communication with the satellite can be limitedly performed. More specifically, the manager can set the time when the communication connected to the satellite is most effective or allows to start a communication when exceeding a predetermined data (for example, over 10 mb). The amount of the data at the above time can be set by the manager (namely, captain). Alternatively, the communication may be obliged to be performed in real time, and in this case, the system may be set to require a manager's authorization if the communication is over a predetermined amount (for example, 1 mega byte).

In this way, with the aid of the satellite communication control unit 130, it is possible to prevent over billing for the use of the satellite communication. In addition, the over loading of the satellite communication can be previously prevented.

The storing unit 140 stores the materials for the satellite communication as well as the inside communication and the contents provided from the land communication server 200. Such a storing unit 140 may use various types of DBs, and in the present embodiment of the present invention, it is not limited thereto.

Of course, the storing unit 140 may store the information of the user who uses the maritime communication server 100 as well as the information related to the billing of the user.

This billing-related information should be synchronized in real time or at every hour with the land management server 400.

The billing unit 150 may be configured to bill the user a predetermined amount for the use of the communication if the communication request from the user terminal 10 is for the use of the satellite communication. At this time, the billing unit 150 checks the billing-related information, namely, the balance of the cyber money or the bank account of the user stored in the storing unit 140 and informs through the satellite communication control unit 130 that a satellite communication is available if a corresponding balance is in the bank account, so the user performs a satellite communication.

In case of the neighbor server communication unit 160, if the ship which operates on the sea locates within a predetermined distance (for example, a couple of kilometers), the maritime communication servers 100 of two ships are obliged to communicate with each other. In this way, a communication between the users of the near ships can be available without using an additional satellite communication.

Of course, a communication between the users on multiple ships locating on the sea can be available through the satellite communication and the land communication server 200, however in this case, it is disadvantageous that the use of the satellite communication is inevitable. Therefore, the present invention allows to freely communicate between the near users on the ships through the neighbor server communication units 160 without any billing.

It is advantageous that the smart devices of the crews who use the ship can be usefully used on the sea in such a way to install in the ship the maritime communication server 100 and to install a plurality of APs, which are possible for communication, in the regions of the ships. In particular, various contents can be shared and enjoyed. The present invention may be used as an important mans for communicating on the ship. In addition, the owner company of the ship can send his emergency instruction to all the crews on the ship.

As mentioned earlier, the maritime communication server 100 may perform a communication with another maritime communication server 100, which distantly locates, through the satellite communication or may perform a communication with the land communication server 200 which locates on the land.

Here, the land communication server 200 may include a land satellite communication unit (not shown) which is intended to communicate with the maritime communication server 100 through a satellite communication, and an outside server communication unit (not shown) which is intended to communicate with various outside servers which locate on the land.

The land satellite communication unit communicates through the satellite communication with the maritime communication unit of the earlier mentioned maritime communication server. For this, the land satellite communication unit may include the coding unit, the decoding unit, the communication judgment unit and the satellite information confirmation unit, which all are mentioned earlier.

The land satellite communication unit is intended to provide the information from the maritime communication server to the outside server through the outside sever communication unit and to transmit the information from the outside server to a corresponding maritime communication server.

The outside server communication unit may include a communication module for a communication with various outside servers. Such an outside server communication unit may perform a communication with the content server 300 serving to product and distribute contents to the user terminal locating at least on the sea and with the management server 400 serving to manage the system of the present invention. Of course, a communication with the server and mail server of each of other mobile communication companies can be performed.

The content server 300 is intended to manage the content information which will be provided to the user terminal and to provide a corresponding content through the maritime communication server 100 to the user terminal 10 locating on the sea. At this time, the contents may be various information. In the exemplary embodiment of the present invention, the information, for example, motion pictures, music, common affair and education material, learning material, game, etc. can be used. In addition, the information may include working instruction, education materials in company, state-of-art equipment manual, etc.

The management server 400 serves to manage the operation of the maritime communication server 100, the land communication server 200, and the content server 300. The management server 400 may include a communication control unit 410, a content control unit 420, an environment setting unit 430, a user management unit 440 and a billing management unit 450.

With the communication control unit 410, it is possible to control a communication between the maritime communication server 100 and the land communication server 200 as well as a communication between the land communication server and the outside server. Namely, it is possible to control the execution and setting of the transmission/reception during the communication and the reception and transmission of a corresponding information.

With the content control unit 420, it is possible to control the orations of the content server 300. Of course, external other contents may be added and provided.

The environment setting unit 430 allows to distantly set the basic setting of each server.

With the user management unit 440, it is possible to perform an information management on the ship on the sea and on the user on the ship.

The billing management unit 450 allows to reliably perform the billing for each user (namely, cyber money payment or electronic payment) while allowing to share the billing state of a corresponding user based on the communication with the maritime communication server 100.

In the above descriptions, that the land communication server 200, the content server 300 and the management server 400 are constituted in the forms of separated servers has been described. However, such a configuration is not limited thereto. Namely, the module performing the function of the land communication server may be added to one server, and the module performing the function of the content server 300 may be added.

Of course, the present invention is not limited thereto, and various variants are available.

As one example, an application allowing to perform a direct satellite communication may be installed at the user terminal, and a communication with the satellite communication network can be performed on the thusly installed app through the satellite communication equipment, so it is possible to provide and use various contents using the mobile terminal on the ship in the same way as on the land.

The above variants will be described below. In the description below, the description same as the technical content of the previously described exemplary embodiment will be omitted.

Figure 9:
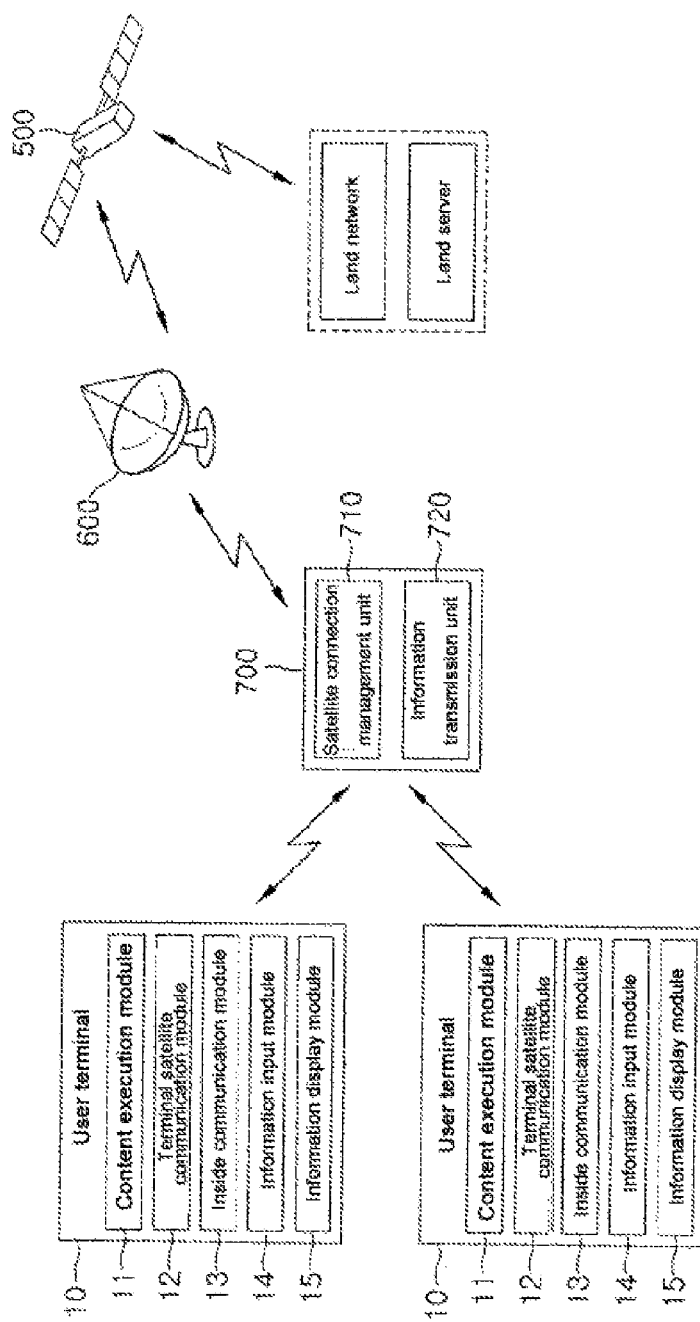
FIG. 9 is a block diagram illustrating a maritime communication system according to a variant of the present invention.

FIG. 9 is a block diagram illustrating the maritime communication system according to a variant of the present invention.

Referring to FIG. 9, the maritime communication system according to a variant of the present invention may include a satellite communication network 500 which is connected to the network and servers on the land and performs a data communication, at least one satellite communication equipment 600 for connection with the satellite communication network 500, at least one user terminal 10 which may be connected to the satellite communication network 600 through the satellite communication equipment 500, and at least one satellite connection server 700 for managing and controlling the satellite connection with the user terminal 10.

The satellite communication equipment 600 and the satellite connection server 700 are installed in the ship sailing on the sea. In addition, the satellite connection server 700 manages the satellite communication connection state of the terminal 10 of the user boarding on the ship.

Here, the satellite communication equipment 600 may include a satellite communication equipment, for example, INMARSAT and VAST.

The user terminal 10 can perform various functions on the app. Here, the user terminal 10 may include a content execution module 11 for executing stored or provided contents, a terminal satellite communication module 12 for performing a satellite communication, an inside communication module 13 for performing other wired or wireless communications except for satellite communication, an information input module 14 for receiving information from the user, and an information display module 15 for displaying information to the user. In addition, the user terminal 10, not illustrated, may further include a storing unit for storing data, etc., and an electric power unit for supplying electric power.

Here, the terminal satellite communication module 12 allows to perform various forms of data communications including voice, and a corresponding module can be configured by installing a separate app at the user terminal.

The terminal satellite communication module 12 may operate in various forms. Namely, a connection of the satellite communication network 500 may be available by the satellite communication equipment in such a way that the terminal satellite communication module 12 communicates with the satellite connection server 700. This means that the data can be transmitted to the satellite communication network 500, the satellite communication equipment 600 and the satellite connection server 700, and the terminal satellite communication module 12 of the user terminal 10. In addition, since the terminal satellite communication module 12 is directly connected to the satellite communication equipment 600 based on the authorization of the satellite connection server 700, the satellite communication network 500 can be connected. This means that the data is transmitted to the satellite communication network 500, the satellite communication equipment and the terminal satellite communication module 12 of the user terminal 10.

Of course, it may be connected to a separate Access Point (AP), and this AP may be connected to the satellite connection server 700 or the satellite communication equipment 600.

In the present exemplary embodiment, since the terminal satellite communication terminal 12 is installed at the user terminal 10, the user can directly connect to the satellite communication equipment using his terminal, namely, his smart device, so the data can be easily transmitted or received at lower cost.

The satellite connection server 700 may include a satellite connection management unit 710 for controlling the connections of the user terminal 10, and an information transmission unit 720 for providing the information provided through the satellite communication equipment 600 to the user terminal 10 or providing the information of the user terminal 10 to the satellite communication network 500 through the satellite communication equipment 600. Of course, since the satellite connection server has the similar configuration and operation with the earlier mentioned maritime communication server, the detailed description thereof will be omitted.

In addition, the communication system, not illustrated, may further include a separate management server for producing and distributing the app of the user terminal, namely, the smart device.

The communicating method of the maritime communication system having the above-described configuration will be described with reference to the accompanying drawings.

The occasion where the user on the land communicates (talks) with the user on the sea through the land communication server in the forms of texts, voice or pictures will be described as follows.

Figure 10:
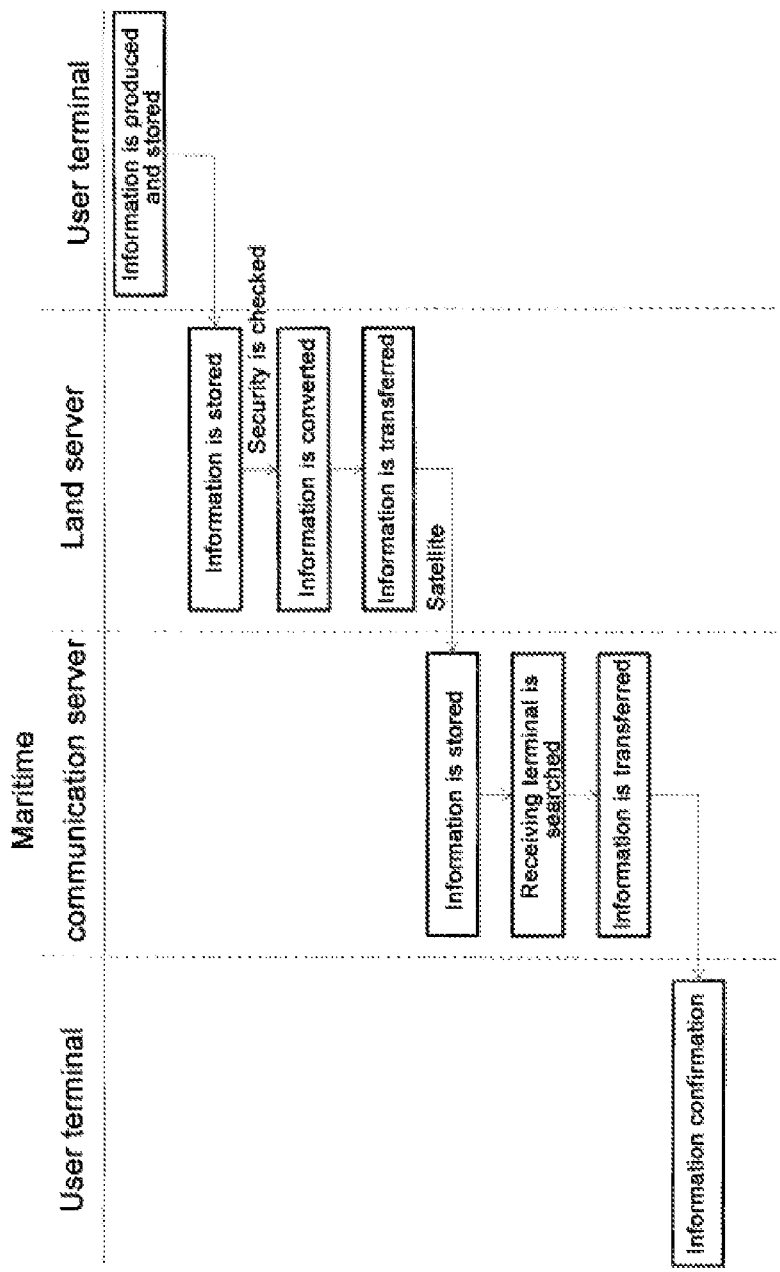
FIG. 10 is a view for describing a method for providing a maritime user with the information of a land user according to an exemplary embodiment of the present invention.

FIG. 10 is a view for describing the method for providing to the maritime user the information of the land user according to an exemplary embodiment of the present invention.

As illustrated in FIG. 10, the user locating on the land makes and stores the information which is intended to be provided through his terminal. At this time, the information of the maritime user terminal which is intended to receive the information is additionally stored in a corresponding information.

Thereafter, the server (land communication server or management server) locating on the land stores a corresponding information and checks the state of security.

In addition, the land server changes the corresponding information to match with the satellite communication and transmits to the maritime communication server through the satellite communication. At this time, the land server may include a user terminal information connected to the maritime communication server in the ship. Therefore, the land server is always checking which maritime communication server the information is provided to, based on the information of the user terminal which is included in the provided information. Thereafter, a corresponding maritime communication server is specified, and the information is transmitted through the satellite.

Thereafter, the maritime communication server stores the received information and compares the information of the user terminal contained in the information with the user terminal information which is being managed thereby. At this time, if the user information is not matched, an error signal is transmitted to the land server, and if matched, the information is provided to a corresponding user terminal.

Thereafter, the maritime communication server transmits a transfer state of a corresponding information to the land server so as to check if the signal has been transmitted good.

Next, the occasion where the maritime user communicates with the user locating on the land through the maritime communication server will be described as follows. At this time, the billing procedure will be described together. The billing-related function may apply to the earlier description and may apply to the next descriptions.

Figure 11:
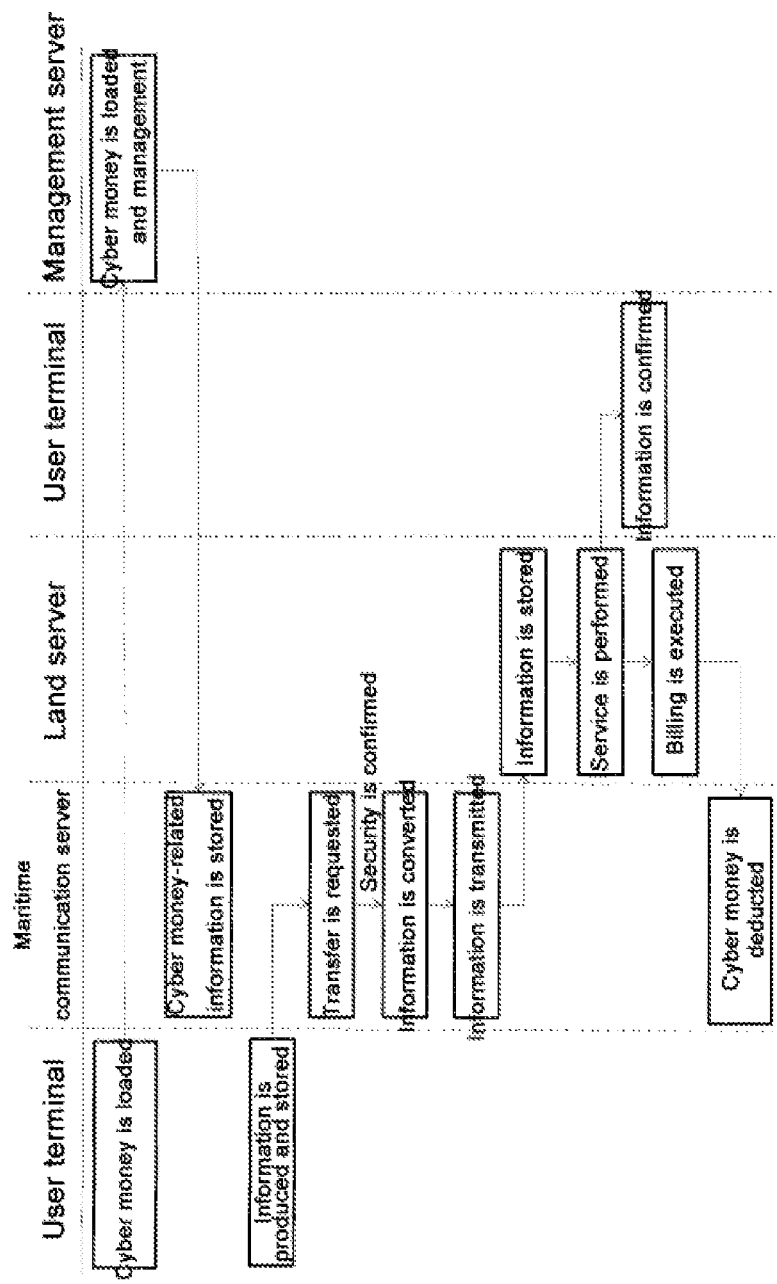
FIG. 11 is a view for describing a method for providing a land user with the information of a maritime user according to an exemplary embodiment of the present invention.

FIG. 11 is a view for describing the method for providing the land user with the information of the maritime user according to an exemplary embodiment of the present invention.

Referring to FIG. 11, the user locating on the maritime ship can load cyber money on his own terminal.

At this time, the loading method may be performed by connecting with the management server locating on the land through the satellite communication. In addition, at this time, the loaded cyber money-related information can be stored in the maritime communication server and may be updated in real time or at a regular cycle.

Next, the user on the ship produces the information on his own terminal and stores the produced information. Thereafter, in case where a transmission is requested, a corresponding information is transmitted to the maritime communication server. At this time, at described earlier, the information of the terminal of another user who is intended to receive the information can be additionally stored.

Thereafter, after the security check, the maritime communication server stores a corresponding information in compliance with the protocol of the satellite communication and transmits through the satellite communication to the land server. The land server which has receive the corresponding information performs a service corresponding to the corresponding information, and if the information has been provided to another user terminal, the procedure for providing the information to the another user terminal. Thereafter, if the transfer of the corresponding information has been completed, the land server notices to the maritime communication server the completion of the transmission. Thereafter, the maritime communication server performs the billing with respect to the maritime user and subtracts the amount of money from the cyber money that the user has, in compliance with the transmission of the information. In addition, in case where the corresponding information corresponds to the provision of the service through a separate service providing company locating on the land, the corresponding information is transmitted to the server of the service providing company. Thereafter, the server receives an order with respect to the corresponding service. In addition, during the proceeding of the service, the service server asks the land server to do the presumed calculation, and the land server transfers the presumed calculation to the maritime communication server. The maritime communication server performs the corresponding bill calculation against the cyber money of the user and provides a result of the calculation to the management server.

In this way, the user locating on the ship transmits the information to the user or service server that wants to receive his information, thus transferring a corresponding information and receiving a desired service.

Next, the information exchange between the users on the ship will be described as follows.

Figure 12:
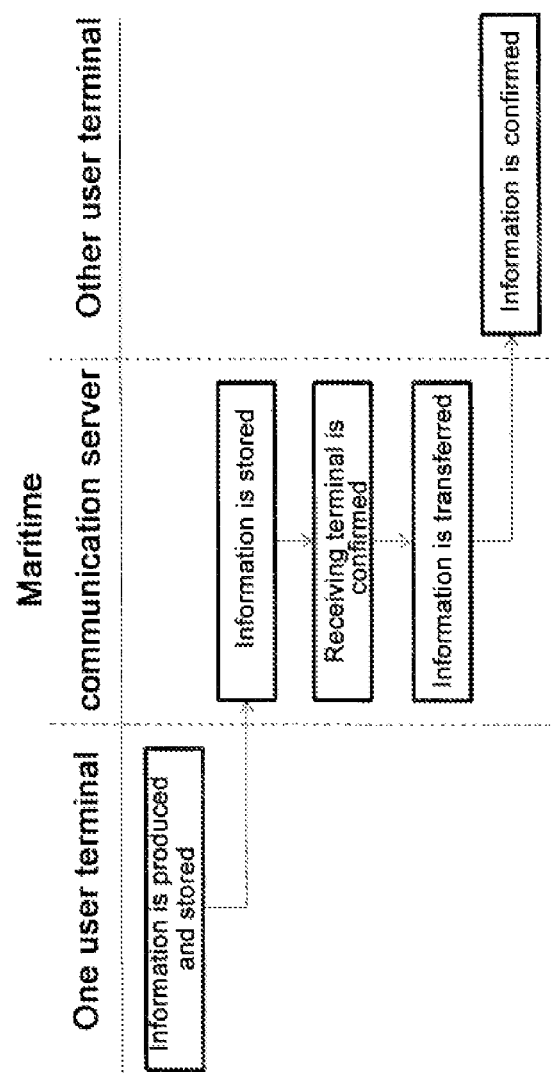
FIG. 12 is a view for describing a communication method between users on the ship according to an exemplary embodiment of the present invention.

FIG. 12 is a view for describing the communicating method between the users on the ship according to an exemplary embodiment of the present invention.

Referring to FIG. 12, a user produces and stores a corresponding information on his own terminal. At this time, the information on the terminal of the user who is intended to receive a corresponding information is stored in the stored information. Thereafter, the user terminal transmits the corresponding information to the maritime communication server. The maritime communication server provides the received information to the user terminal. In this way, the information exchange between the users on the ship can be performed.

In addition, as not illustrated in the drawings, in case of the simultaneous broadcasting, a user produces an information for the simultaneous broadcasting and stores the produced simultaneous broadcasting. Thereafter, the corresponding information is transmitted as the information for the simultaneous broadcasting to the maritime communication server. In this way, the maritime communication server can provide the corresponding simultaneous broadcasting to all the user terminals that it manages, thus performing the whole simultaneous broadcasting.

Next, the use of the content service will be described as follows.

Figure 13:
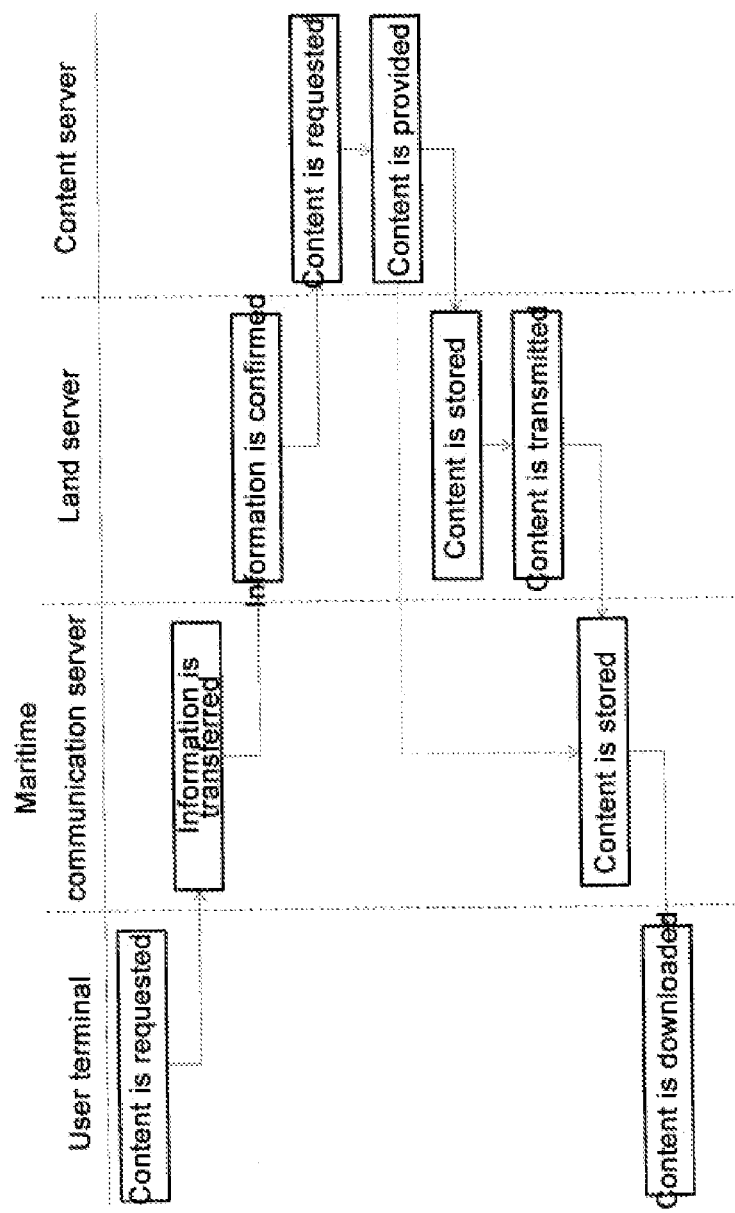
FIG. 13 is a view for describing a method for receiving content information according to an exemplary embodiment of the present invention.

FIG. 13 is a view for describing the method for receiving the content information according to an exemplar embodiment of the present invention.

Referring to FIG. 13, the user on the ship requests a content information on his own terminal. The maritime communication server stores the request information and transmits through the satellite communication to the land server. At this time, the information that is transmitted to the land communication server contains a maritime communication server information and the terminal information of the user who has requested the content.

Thereafter, the land server request the content server the corresponding content. Therefore, the content server transmits the corresponding content to the land server. The land server stores the corresponding content and then transfer the corresponding content through the satellite communication to the maritime communication server.

The maritime communication server stores the corresponding content and informs the user of the reception of the content, and the user downloads the corresponding content on his own terminal. Thereafter, the user uses the corresponding content.

Of course, in the above description, alternatively, the corresponding content may not be stored in the land server, and may be directly transmitted through the satellite communication to the land communication server instead. In addition, a predetermined bill for the request of the content may be given.

In addition, the app installed in the user terminal may register and store the friend-related information and may categorize it into groups for the sake of efficient management.

In addition, in case of the satellite communication, after the communication state is judged based on the manager's setting of the maritime communication server, the satellite communication may be performed based on a result of the judgment.

Therefore, the maritime working employees can dialog with their families and friends on the land and colleagues on another ship and can transmit and receive messages or e-mails. In addition, on the sea, it is possible to receive various contents and to use the same.

It is noted that the above technical concepts of the present invention have been described in detail in the exemplary embodiments of the present invention, however the disclosed exemplary embodiments are intended to provide only the descriptions, not to limit it. In addition, a person having ordinary skill in the art can understand that various exemplary embodiments are also available within the scope of the technical concepts of the present invention.

LEGENDS OF REFERENCE NUMBERS

10: User terminal
100: Maritime communication server
110: Maritime satellite communication unit
120: Inside communication unit
130: Satellite communication control unit
140: Storing unit
150: Billing unit
160: Neighbor server communication unit
200: Land communication server
300: Content server
400: Management server
410: Communication control unit
420: Content control unit
430: Environment setting unit
440: User management unit
450: Billing management unit

What is claimed is:

1. A maritime communication system, comprising:
a plurality of user terminals which can use Social Network Service (SNS) on a sea, an application being installed on each of the plurality of user terminals to provide contents;
at least one first maritime communication server which provides the SNS and the contents of the plurality of user terminals on the sea;
a land communication server which communicates with the at least one first maritime communication server through a satellite, thus controlling communications between a user terminal of the plurality of user terminals locating on land and a terminal of a user using a second maritime communication server located distantly from said at least one first maritime communication server;
a content server which provides a control of the application through the land communication server; and
a management server which produces and distributes the application being installed on said each of the plurality of user terminals or controls operations of servers in the Mari-time communication system,
wherein the at least one first maritime communication server, comprises a maritime satellite communication unit for communicating with the land communication server through the satellite communication, and a satellite communication control unit for controlling satellite communications,
wherein the maritime satellite communication unit comprises a communication result judgment unit for judging the result of the satellite communication, and
wherein the at least one first, maritime communication server performs a communication with the second maritime communication server through the satellite communication.

2. The maritime communication system of claim 1, wherein the user terminal comprises:
a content execution module for executing stored or the provided contents;
a terminal satellite communication module for performing the satellite communication;
an inside communication module for performing other wired or wireless communications except for the satellite communication;
an information input module for receiving information from the user; and
an information display module for displaying the information to the user.

3. The maritime communication system of claim 1, wherein for the user terminal, a smart device which can provide the SNS service is used, the smart device being available for message transmission, photo transmission, email transmission and wired/wireless talk function and receptions of the contents.

4. The maritime communication system of claim 1, wherein the at least one first maritime communication server comprises:
   an inside communication unit for controlling the communications between the plurality of the user terminals on a ship wherein the at least one Mari-time server is installed;
   a storing unit for storing information which contains the contents; and
   a billing unit for billing the plurality of user for the use of the server.

5. The maritime communication system of claim 1, wherein the at least one first maritime communication server further comprises a neighbor server communication unit for communication with near ships.

6. The maritime communication system of claim 4, wherein the maritime satellite communication unit comprises:
   an information coding unit for coding the information, which is provided to the satellite, in compliance with protocol of the satellite communication;
   a decoding unit for decoding the information provided from the satellite; and a satellite information confirmation unit for storing and confirming the satellite information.

7. The maritime communication system of claim 4, wherein the inside communication unit comprises:
   a text communication module which allows SNS type communication between users of a smart devices on the ship;
   a voice communication module which allows a voice dialog; and
   a simultaneous broadcasting module which can provide text or voice information to all the users of the smart devices on the ship.

8. The maritime communication system of claim 1, wherein the land communication server comprises:
   a land satellite communication unit which can perform communication with the at least one first maritime communication server through the satellite communication; and
   an outside server communication unit which can perform communication with the outside server locating on the land.

9. The maritime communication system of claim 1, wherein the management server comprises:
   a communication control unit for controlling the communications between the at least one first maritime communication server and the land communication server or the land communication server and an outside server;
   a content control unit for controlling operations of the content server;
   an environment setting unit for remotely adjusting basic settings of each server in the Mari-time communication system;
   a user management unit for managing information of a user who works on a ship; and
   a billing management unit for billing each user of the plurality of users.

10. The maritime communication system of claim 1, wherein the at least one first maritime communication server manages the satellite communication based on the judgment of the result of the satellite communication.

11. A maritime communication method using the maritime communication system of claim 1, further comprising:
    a step wherein information is produced and stored on a user terminal;
    a step wherein a transmission of the information through the land or the at least one first maritime communication server is requested;
    a step wherein the land or the at least one first maritime communication server provides information to an opponent server through the satellite communication; and
    a step wherein the information is provided to another corresponding user terminal, and
    the produced information contains the information of the another corresponding user terminal of an opponent side which is intended to receive the information, and the at least one first maritime communication server confirms if the receiving terminal is the terminal that the at least one first maritime communication server manages, and the land server confirms if a receiving terminal is the terminal that a predetermined maritime communication server in the at least one first maritime communication server manages.

12. The maritime communication method of claim 11, wherein a loading of a cyber money is requested on the user terminal, and the management sever locating on the land loads and manages the cyber money, and a corresponding cyber money-related information is stored in the at least one first maritime communication server and the cyber money is deducted based on a service request by a maritime communication user.

* * * * *